US006253303B1

(12) United States Patent
Shibuya

(10) Patent No.: US 6,253,303 B1
(45) Date of Patent: *Jun. 26, 2001

(54) AUDIO SIGNAL PROCESSING CIRCUIT

(75) Inventor: Yoshitaka Shibuya, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,869

(22) Filed: Aug. 11, 1997

(30) Foreign Application Priority Data

Aug. 9, 1996 (JP) .................................................. 8-227760

(51) Int. Cl.⁷ .................................................. G06F 12/00
(52) U.S. Cl. .............................................. 711/217; 700/94
(58) Field of Search ................................. 711/217, 154, 711/200, 202, 218

(56) References Cited

U.S. PATENT DOCUMENTS

| | | | |
|---|---|---|---|
| 5,412,740 | * | 5/1995 | Fadavi-Ardekani .................. 382/293 |
| 5,448,706 | * | 9/1995 | Fleming et al. .................. 395/421.07 |
| 5,572,691 | * | 11/1996 | Koudmani ............................ 395/405 |
| 5,623,423 | * | 4/1997 | Lipovski ........................ 364/514.12 |
| 5,640,421 | * | 6/1997 | Sonohara et al. .................... 375/240 |
| 5,646,960 | * | 7/1997 | Sonohara et al. .................... 375/340 |
| 5,761,726 | * | 6/1998 | Guttag et al. ......................... 711/147 |
| 5,798,991 | * | 8/1998 | Haneda ................................... 369/47 |
| 5,857,000 | * | 1/1999 | Jar-Ferr et al. ...................... 375/240 |
| 5,867,819 | * | 2/1999 | Fukichi et al. ....................... 704/500 |
| 6,029,136 | * | 2/2000 | Tsutsui ................................ 704/500 |

FOREIGN PATENT DOCUMENTS 7-297725    11/1995 (JP) .
8-16192     1/1996 (JP) .

OTHER PUBLICATIONS

International Standard © ISO/IEC 111723–3: 1993 (E), pp. 1, 30–32, and 39.

* cited by examiner

Primary Examiner—Forester W. Isen
Assistant Examiner—Brian Pendleton
(74) Attorney, Agent, or Firm—Sughrue, Mion, Zinn, Macpeak & Seas, PLLC

(57) ABSTRACT

Input subband samples are requantized by a requantizing circuit and the results are stored in a DCT memory as DCT samples for discrete cosine transform. A DCT circuit applies a discrete cosine transform to the DCT samples stored in the DCT memory and stores the results in a band synthesis memory as band synthesis samples. When storing these band synthesis samples in the band synthesis memory, the storage area for each band synthesis sample is designated by alternately switching between two types of addresses generated by a first and second address generating circuits and the timing of processing by the DCT circuit is controlled in accordance with the band synthesis samples necessary for the calculation of output audio samples.

5 Claims, 7 Drawing Sheets

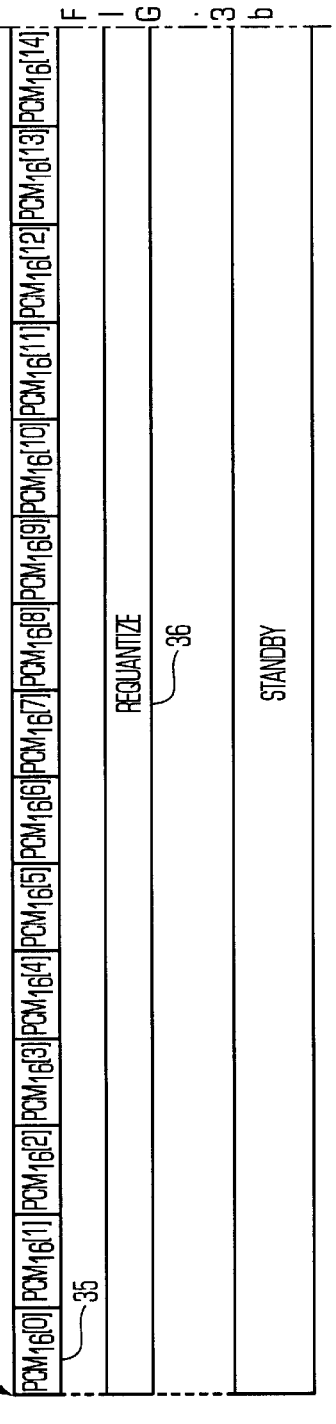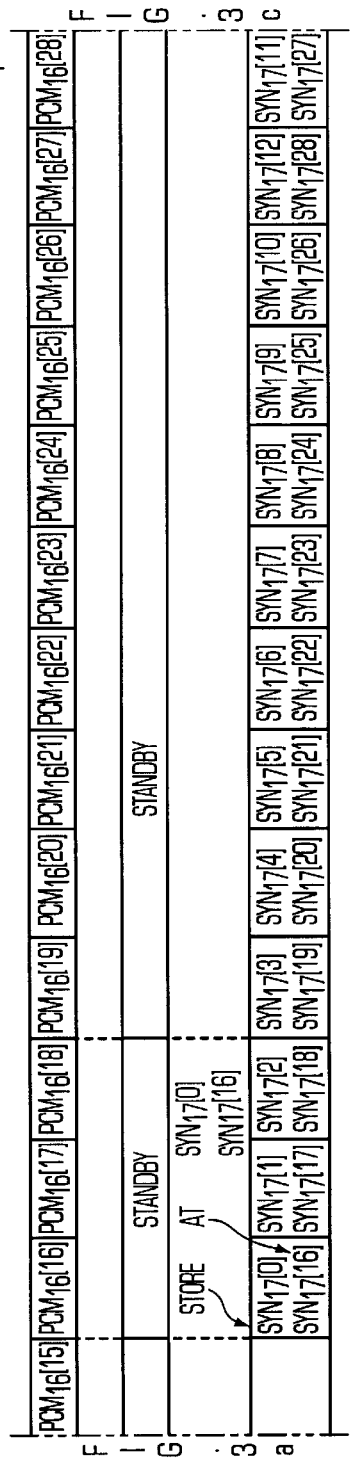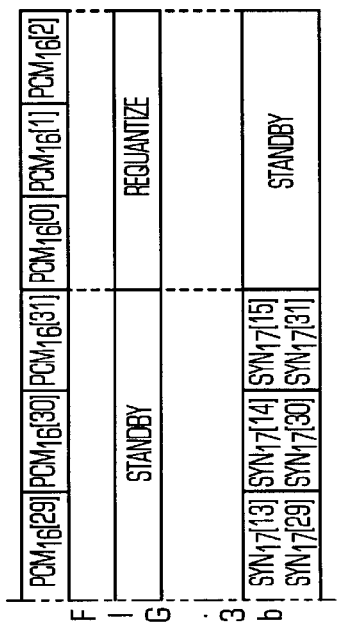

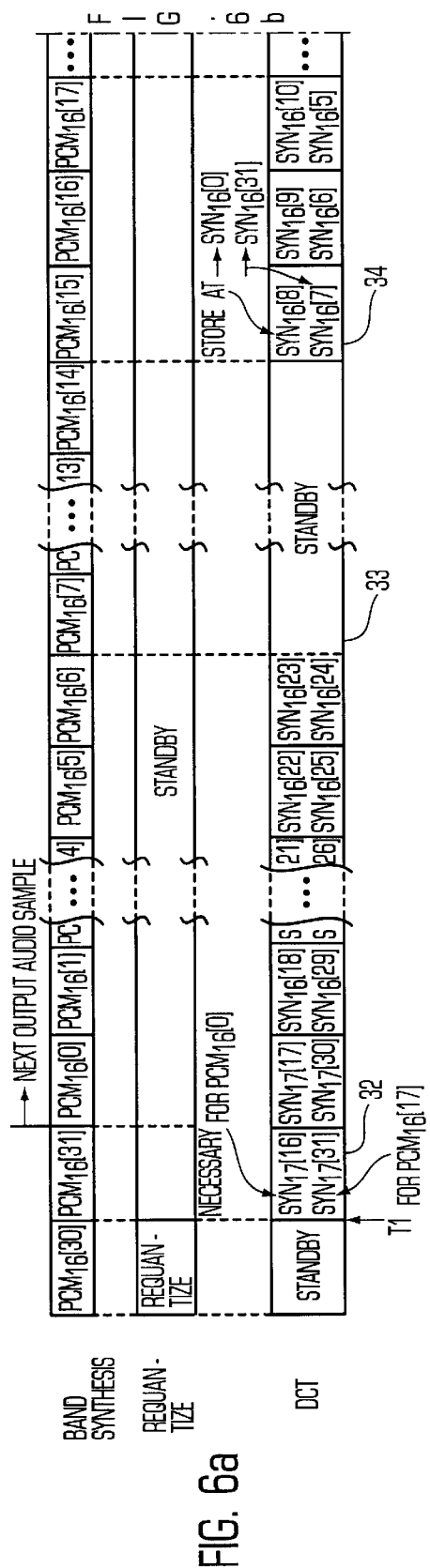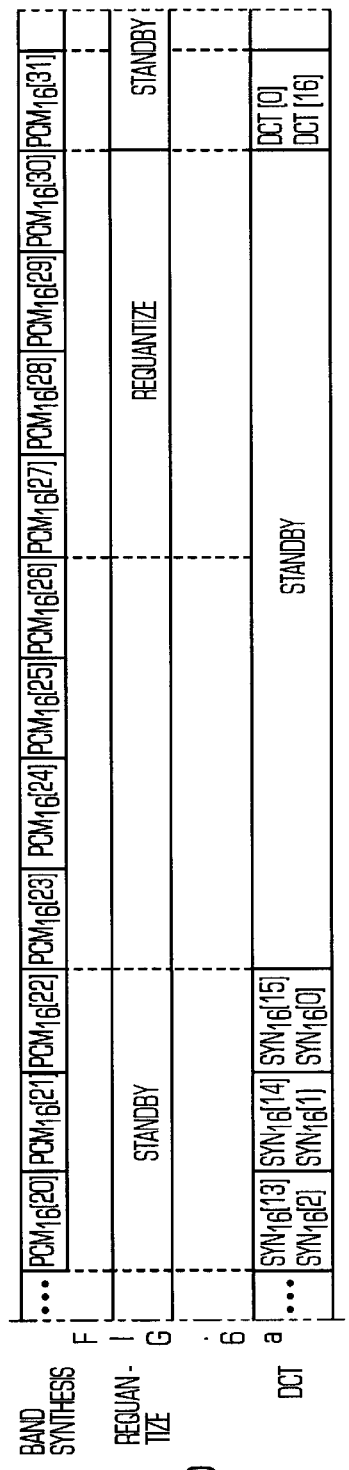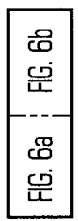
FIG. 6

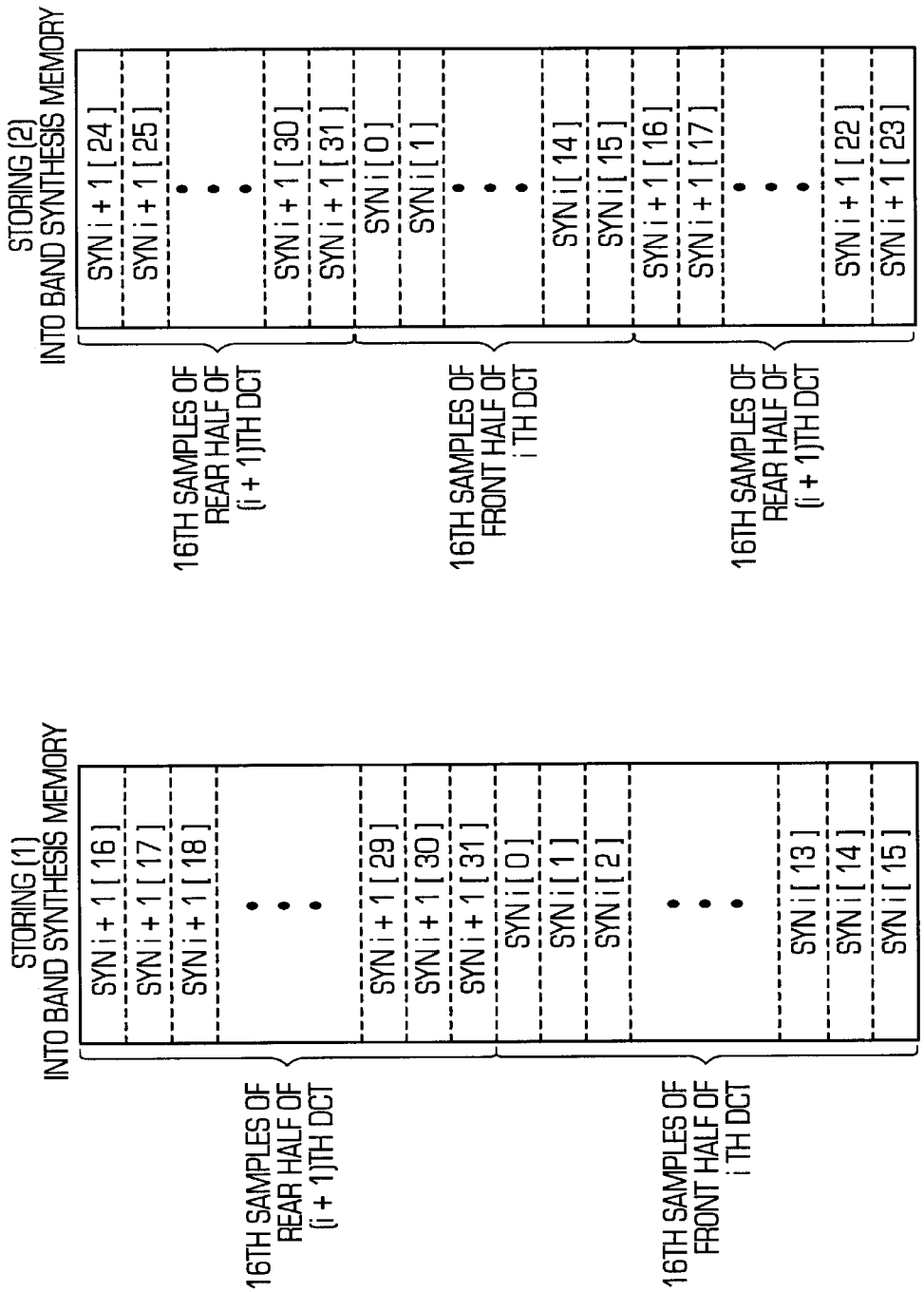

AUDIO SIGNAL PROCESSING CIRCUIT

BACKGROUND OF THE INVENTION

1. Field of the Invention:

The present invention relates to a signal processing device, and particularly to an audio signal processing circuit which inputs subband samples of audio signals that have been divided and quantized in advance for each frequency band, processes these signals and outputs the results as audio samples.

2. Description of the Related Art:

ISO/IEC 11172-3 contains provisions for the international standards for an expansion circuit for compressed audio signals in such an audio signal processing circuit. An example of the construction of this type of audio signal processing circuit of the prior art is shown in FIG. 1. The circuit shown in FIG. 1 carries out a discrete cosine transform (DCT) of the subband signal, combines bands, and generates an audio signal.

This audio signal processing circuit is composed of requantizing circuit 12; DCT memory 14 for storing DCT samples for discrete cosine transform; DCT circuit 16 for carrying out discrete cosign transforms; band synthesis memory 18; address generating circuit 44; band synthesis circuit 20; and control circuit 43 for controlling the operation of these circuits.

Requantizing circuit 12 requantizes a quantity N (where N is an integer product of 4) of input subband samples 1, which have been quantized to differing word lengths for each frequency, for every group of 32 samples, and stores the requantized 32 DCT samples 13 in DCT memory 14.

DCT circuit 16 applies a discrete cosine transform represented by the following formula (1) to DCT samples 15 stored in DCT memory 14, and stores the 32 band synthesis samples 17 comprising from syn[0] to syn[31] resulting from the transform into band synthesis memory 18.

$$syn[k] = \sum_{i=0}^{31} \cos((2k+1)i\pi/64) \quad (1)$$

Address generating circuit 44 generates addresses in band synthesis memory 18 in which band synthesis samples 17 calculated by DCT circuit 16 are stored. Band synthesis memory 18 has a storage area for 512 samples made up of 16 blocks of 32 samples each.

The block for storage of each discrete cosine transform is successively shifted such that, when the first 32 samples resulting from discrete cosine transform are stored in the first block, the next 32 samples resulting from discrete cosine transform are stored in the second block, and when samples have been stored in all 16 blocks, the next results of discrete cosine transform are again stored in the first block.

Band synthesis circuit 20 extracts one sample from each block of data stored in band synthesis memory 18 for each fixed time period determined as the sampling period for a total of 16 samples, carries out a product/sum operation, and outputs the result of this operation as output audio sample 11 for one sample.

Regarding the overall operation of this audio signal processing circuit, when 32 quantized input subband samples 1 are inputted to requantizing circuit 12, requantizing circuit 12 first requantizes this input and then stores the resulting 32 DCT samples 13 into DCT memory 14.

DCT circuit 16 carries out the DCT operation on DCT samples 13 stored in DCT memory 14, and stores the resulting 32 band synthesis samples 17 (from syn[0] to syn[31]) in one block within band synthesis memory 18.

Thirty-two output audio samples 11 (from pcm[0] to pcm[31]) are calculated after the completion of the nth DCT processing and the storage of band synthesis samples 17 in band synthesis memory 18. For every calculation of one output audio sample 11, a total of 16 band synthesis samples 19 are extracted, one sample being extracted from each block of band synthesis memory 18 for use in this calculation.

The ith output audio sample pcm[i] of the 32 output audio samples 11 is calculated according by the following formula (2):

$$\begin{aligned}
&\text{if } 0 \le i < 16, \text{ then} \\
&\quad pcm_n[i] = \sum_{P=o}^{7}(syn_{n-2P}[i+16] - syn_{n-2P-1}[16-i]) \\
&\text{if } i = 16, \text{ then} \\
&\quad pcm_n[i] = \sum_{P=n}^{7}(-syn_{n-2P-1}[16-i]) \\
&\text{if } 17 \le i \le 31, \text{ then} \\
&\quad pcm_n[i] = \sum_{P=n}^{n+7}(-syn_{n-2P}[48-i] - syn_{n-2P-1}[i-16])
\end{aligned} \quad (2)$$

In a case in which band synthesis circuit 20 calculates output audio sample 11 immediately after the results outputted from DCT circuit 16 are stored in band synthesis memory 18, for example, in a case in which pcm[i] is calculated in order for i=0 to i=31 immediately after the 16th DCT results are stored in block 16, the band synthesis samples necessary for the calculation are as shown by the half-tone portions in FIG. 2(a).

Next, the band synthesis samples necessary for calculation of pcm[i] of output audio sample 11 immediately after storing the 17th DCT results in band synthesis memory 18 are as shown by the half-tone portions in FIG. 2(b).

At the time of the state shown in FIG. 2(a), the data of from syn[17] to syn[31] of block 1 will not be used again. Based on formula (2), the memory is vacated successively beginning from syn[0] of block 1 after calculating pcm[16]. In other words, syn[0] is no longer necessary after calculating pcm[16], and syn[1] is no longer necessary after calculating pcm[17]. Processing can be continued by again storing band synthesis samples 19 in these areas that successively become unnecessary.

FIG. 3 is a timing chart showing the relation between the requantizing process, the DCT process, and the synthesizing process, and shows the calculation of 32 output audio samples 11 up to the beginning of the calculation of the next 32 output audio samples.

Band synthesis samples are stored in blocks 1 to 16 of band synthesis memory 18. With the start of the calculation of pcm[0] (35 in FIG. 3), requantizing circuit 12 first requantizes input subband samples 1 and stores the results in DCT memory 14 (36 in FIG. 3).

At this time, the portions in which from syn[17] to syn[31] were stored in block 1 of band synthesis memory 18 are vacated, and after calculating pcm[16], become vacant in order from syn[0] to syn[1] to syn[2], and so on. DCT circuit 16 therefore proceeds calculating and storing syn[i] in the order of this vacating of the memory (37 in FIG. 3).

This configuration of the prior art requires memory for 32 samples in DCT memory 14 (a total of 768 bits if each sample comprises 24 bits) and for 512 samples in band synthesis memory 18 (a total of 12,288 bits).

SUMMARY OF THE INVENTION

In the above-described prior art, the memory capacity required in the band synthesis circuit increases with the increase in the number of samples and with the number of bits making up one sample, and as a consequence, the prior art has the drawbacks of large circuit size and high cost. In view of the above-described problems of the prior art, the object of the present invention is therefore to reduce the amount of memory required in the band synthesis circuit of an audio signal processing circuit.

In order to realize the above-described object, the audio signal processing circuit according to the present invention includes: a requantizing circuit that requantizes a number N of inputted subband samples and generates N DCT samples; a DCT memory in which are stored N DCT samples; a DCT circuit that applies a discrete cosine transform on N DCT samples stored in the DCT memory and generates band synthesis samples; a band synthesis memory having a storage area for storing (M−1) blocks of band synthesis samples outputted from the DCT circuit, each block comprising N samples; first and second address generating circuits that generate addresses designating different storage areas; an address selecting circuit that alternately selects addresses generated by each of the address generating circuits and notifies the band synthesis memory; and a band synthesis circuit that, for each sampling period, extracts band synthesis samples in portions of M samples from the band synthesis memory and generates output audio samples.

The above and other objects, features, and advantages of the present invention will become apparent from the following description referring to the accompanying drawings which illustrate an examples of preferred embodiments of the present invention.

BRIEF DESCRIPTION OF THE DRAWINGS

FIG. 3 is a timing chart showing the operation of an audio signal processing circuit of the prior art.

FIG. 6 is a timing chart showing the operation of the audio signal processing circuit of the present invention.

FIG. 7 shows the disposition of samples written to a band synthesis memory according to the present invention.

DETAILED DESCRIPTION OF THE PREFERRED EMBODIMENTS

Figure 1:
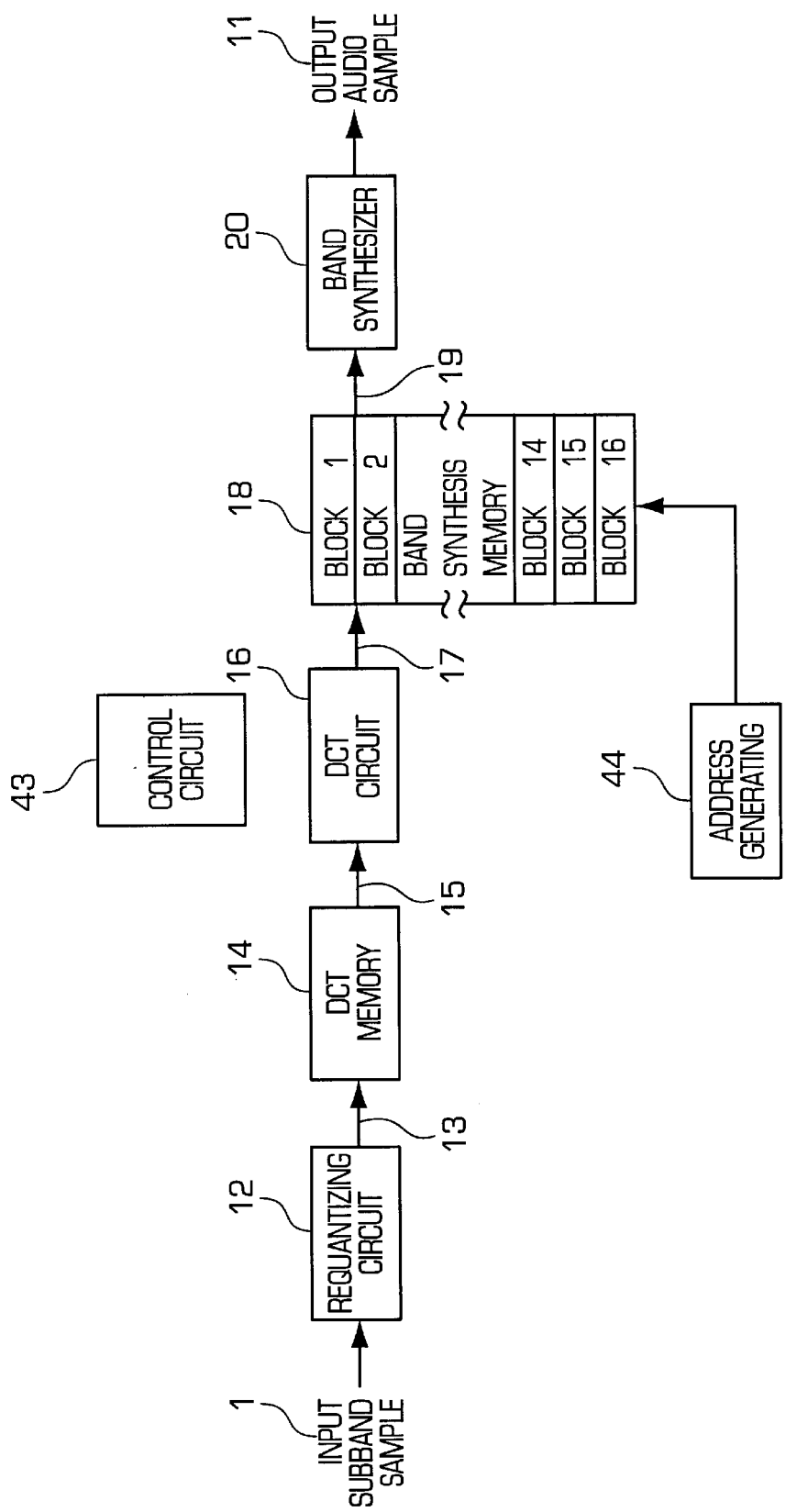
FIG. 1 shows the configuration of one example of an audio signal processing circuit of the prior art.
Figure 4:
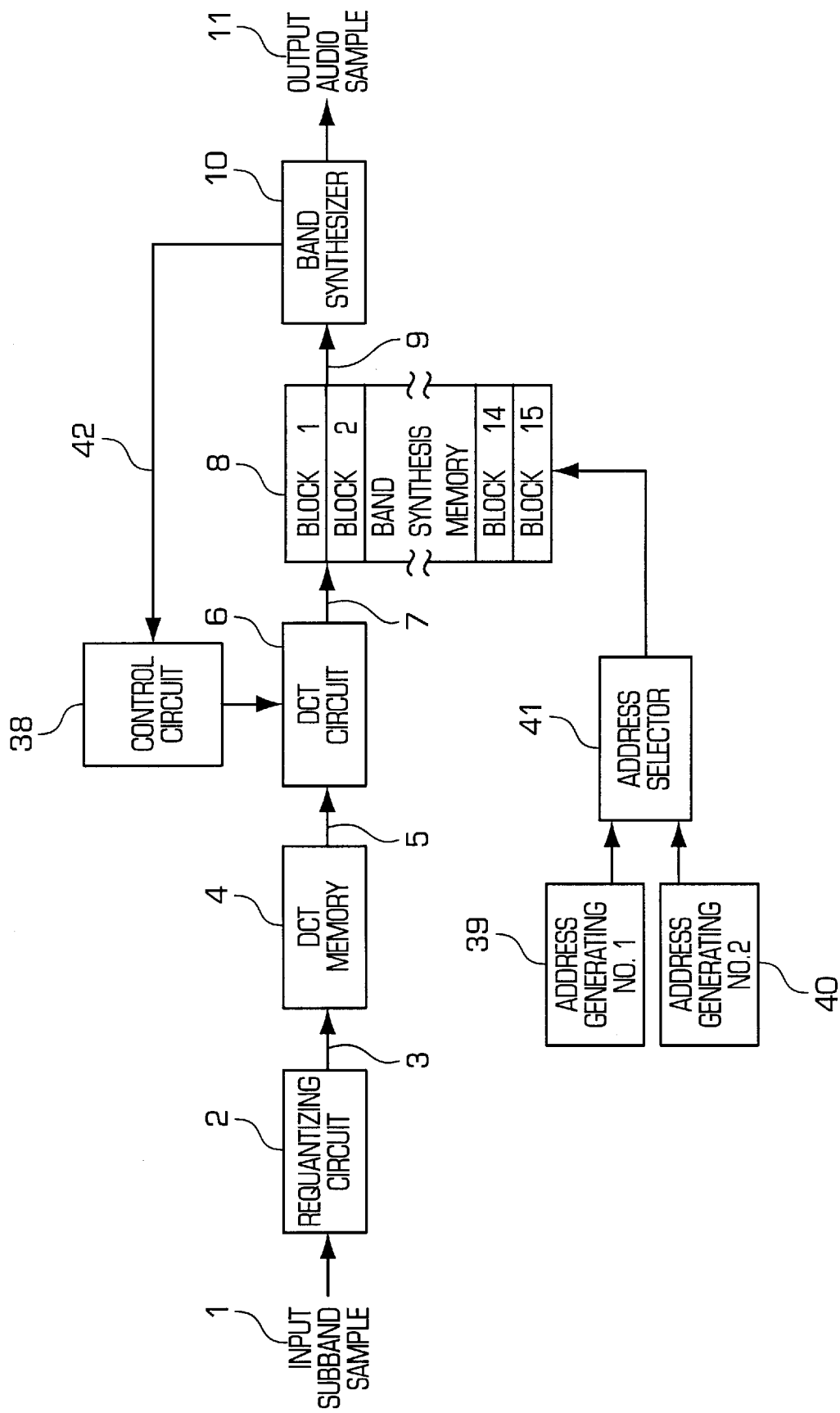
FIG. 4 shows the configuration of one embodiment of the audio signal processing circuit of the present invention.

As in the prior-art example shown in FIG. 1, the audio signal processing circuit of the present invention basically comprises a requantizing circuit, a DCT memory, a DCT circuit, a band synthesis memory, an address generating circuit, a band synthesis circuit, and a control circuit; but according to one embodiment of the present invention as shown in FIG. 4, band synthesis memory 8 further includes: a storage area for storing (M−1) blocks of N samples each of band synthesis samples outputted from DCT circuit 6; two address generating circuits, one being a first address generating circuit 39 that generates addresses of a first mapping method and the other being a second address generating circuit 40 that generates addresses of a second mapping method; and address selecting circuit 41 which alternately selects the addresses generated by address generating circuits 39 and 40 and which informs band synthesis memory 8.

The addresses of the first mapping method are the prescribed addresses from (1) to (N/2) of band synthesis memory 8 at which are stored N/2 samples from (0) to (N/2−1) of the N samples resulting from the nth discrete cosine transform, and the prescribed addresses from (N/2) to (N−1) of band synthesis memory 8 at which are stored N/2 samples from (N/2) to (N−1) of the N samples resulting from the (n+1)th discrete cosine transform; and the addresses of the second mapping method are the prescribed addresses from (1) to (N/4) and from (3N/4+1) to (N) of band synthesis memory 8 at which are stored N/2 samples from (0) to (N/2−1) of the N samples resulting from the nth discrete cosine transform, and the prescribed addresses from (N/4+1) to (3N/4) of band synthesis memory 8 at which are stored the N/2 samples from (N/2) to (N−1) of the N samples resulting from the (n+1)th discrete cosine transform.

Address selecting circuit 41 alternately selects first address generating circuit 39 and second address generating circuit 40 each time band synthesis samples are stored in band synthesis memory 8 to designate the storage addresses in band synthesis memory 8. Accordingly, either the first or the second mapping method is selected such that the address layout changes with respect to the previously written address each time a band synthesis sample is stored in a storage block of band synthesis memory 8.

DCT circuit 6 first calculates band synthesis samples for (N/2) samples, then calculates band synthesis samples up to (N−1) samples, and stores the results in band synthesis memory 8. DCT circuit 6 then temporarily halts processing;

confirms that the number of unnecessary band synthesis samples, which are band synthesis samples within a block among the blocks of the band synthesis memory in which the least recent DCT results are stored, which have already been used in the calculation of output audio samples, and which will not to be used again, is a nonzero number;

then resumes processing;

and calculates band synthesis samples from (0) to (N/2−1) and stores the results in the area in which the unnecessary band synthesis samples were stored.

Referring to the accompanying FIG. 4, a concrete example will next be described regarding an audio signal processing circuit in which N=32 samples for input subband samples 1.

Requantizing circuit 2 requantizes input subband samples 1 for which N=32 samples, and stores the resulting 32 DCT samples 3 to DCT memory 4.

DCT circuit 6 performs a discrete cosine transform on the 32 DCT samples 3 stored in DCT memory 4, generates 32 band synthesis samples 7, and stores these band synthesis samples 7 in band synthesis memory 8.

This band synthesis memory 8 has a storage area for fifteen blocks with 32 samples of band synthesis samples 7 constituting one block for a total of 480 band synthesis samples 7. These band synthesis samples 7 are mapped into the band synthesis sample 7 storage area according to addresses generated by first or second address generating circuits 39 and 40.

In other words, of the 32 samples of the band synthesis samples 7 to first undergo discrete cosine transform, the sixteen samples constituting the first half represented by syn[0] to syn[15], and of the 32 samples of the band synthesis samples 7 to undergo the succeeding (i+1)th discrete cosine transform, the sixteen samples constituting the second half represented by syn[16] to syn[31], together make up a total of 32 samples which are sequentially stored into one of the fifteen blocks of band synthesis memory 8.

Accordingly, the sixteen samples which are the second half of samples resulting from the first discrete cosine transform are stored in block #1; the sixteen samples which are the first half of samples resulting from the first discrete cosine transform and the sixteen samples which are the second half of samples resulting from the second discrete cosine transform are stored in block #2; the sixteen samples which are the first half of samples resulting from the second discrete cosine transform and the sixteen samples which are the second half of samples resulting from the third discrete cosine transform are stored in block #3; and when storage has been completed to all fifteen blocks, results of the next discrete cosine transform are again stored in block #1.

Band synthesis circuit 10 extracts sixteen stored band synthesis samples from band synthesis memory 8, carries out the product/sum operation according to formula (2), and generates and outputs one output audio sample.

Figures 2A, 2B:
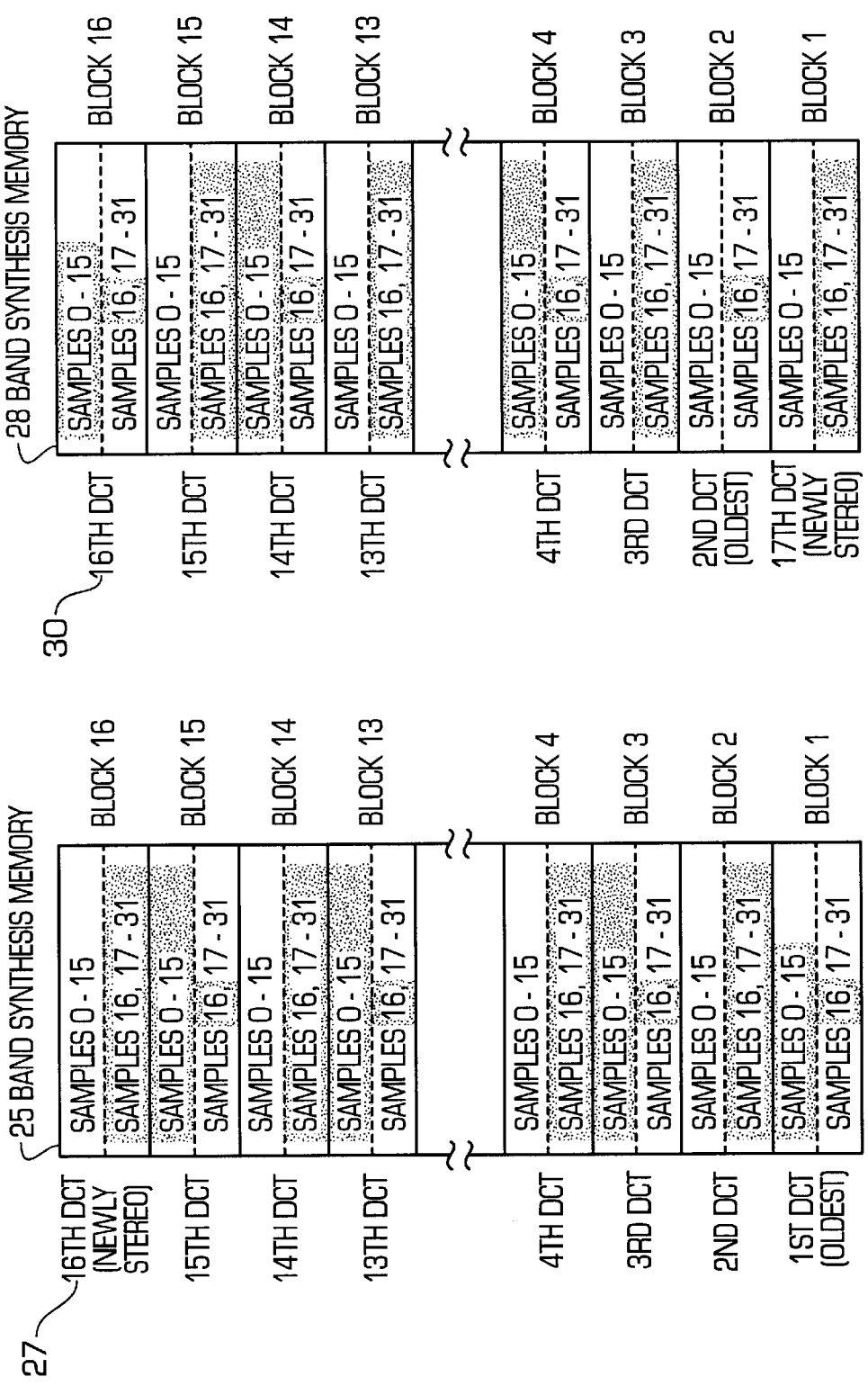
FIG. 2 is an explanatory view showing a method of using a band synthesis memory of the prior art.

Regarding a comparison of the operation of the present embodiment and that of the prior art, as shown in FIG. 2, after completion of the sixteenth discrete cosine transform and writing of band synthesis samples 17 to block 16 of band synthesis memory 18, the calculation of 32 output audio samples from pcm[0] to pcm[31] calls for the half-tone portions of blocks 1 to 16, i.e., syn[16] of each block, from syn[0] to syn[15] of block 1, from syn[17] to syn[31] of block 2, from syn[0] to syn[15] of block 3, and so on up to from syn[17] to syn[31] of block 14, from syn[0] to syn[15] of block 15, and from syn[17] to syn[31] of block 16, and as a result, the calculation of these output audio samples from pcm[0] to pcm[31] calls for neither the oldest band synthesis samples stored in block 1, i.e., from syn[17] to syn[31], nor the most recent band synthesis samples stored in block 16, i.e., from syn[0] to syn[15].

Next, following the completion of the seventeenth discrete cosine transform and immediately after band synthesis samples 17 are written to block 1 of band synthesis memory 18, the calculation of output audio samples from pcm[0] to pcm[31] requires syn[16] and from syn[17] to syn[31], which are the most recent band synthesis samples of the band synthesis samples stored in block 1, and syn[16], which is the least recent band synthesis sample of the band synthesis samples stored in block 2, but does not require from syn[17] to syn[31] of block 2 or from syn[0] to syn[15] of block 1.

Generally speaking, neither samples 17–31 (from syn[17] to syn[31]) of the least recent 32 band synthesis samples nor samples 0–15 (from syn[0] to syn[15]) of the most recent 32 band synthesis samples are required when calculating each of the output audio samples.

The present invention essentially provides a method of assigning addresses to band synthesis samples such that unnecessary data are not stored, thereby reducing the amount of band synthesis memory that is necessary.

Figure 5:
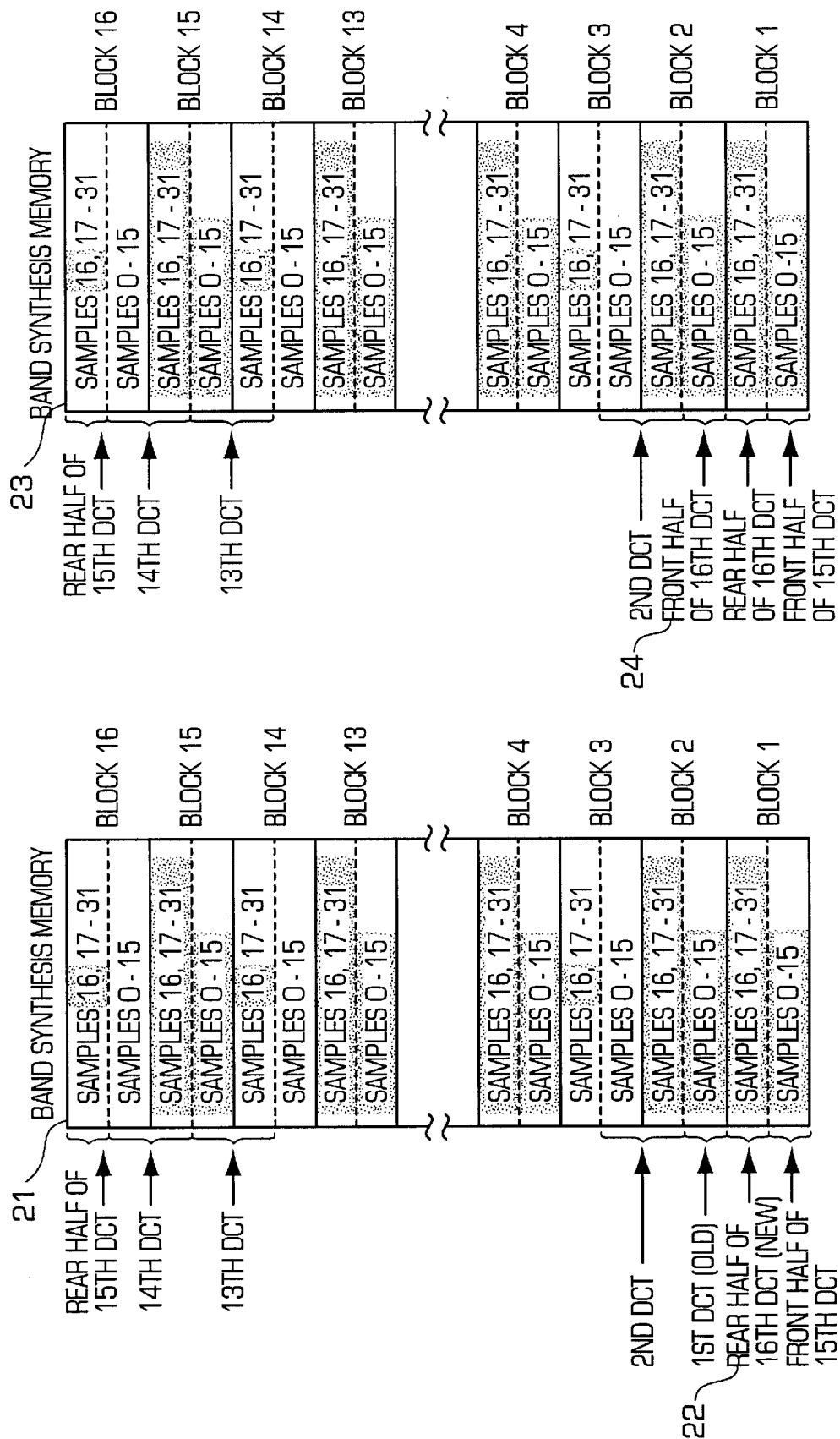
FIG. 5 is an explanatory view showing the method of using a band synthesis memory of the second embodiment of the present invention.

The second embodiment of the present invention will next be described with reference to FIG. 5 and FIG. 6.

It is here assumed that as the initial state, the fifteenth discrete cosine transform has been completed and the fifteen band synthesis samples 7 have already been stored in band synthesis memory 8, and explanation therefore begins with the sixteenth discrete cosine transform process.

First, input subband samples 1 are requantized, and the resulting discrete cosine transform samples 3 are stored in DCT memory 4. The DCT samples are then read from DCT memory 4, and the sixteenth DCT processing begins as follows (at the time indicated as t1 in FIG. 7).

First, the calculation sequence commences with the calculation of from syn[16] to [31], which constitute the second half of the 32 samples from syn[0] to syn[31] resulting from the sixteenth discrete cosine transform, because these are the samples required for the calculation of the next output audio samples from pcm[0] to pcm[31]. In other words, syn[16] is required for the calculation of pcm[0], syn[17] is required for the calculation of pcm[1], and the calculation sequence proceeds syn[16], syn[17], syn[18] and so on. When the calculation of from syn[16] to syn[31] is completed, DCT circuit 6 halts processing and enters a standby state (33 in FIG. 6) during the time interval from the completion of the calculation of output audio sample pcm[16] to the vacating of band synthesis memory 8 in accordance with DCT queue signal 42 outputted from band synthesis circuit 10 to control circuit 38.

After the calculation of output audio sample pcm[16] in accordance with Formula (2); the storage area of syn[0] within block 2, in which are stored the least recent band synthesis samples, becomes vacant; the storage area of syn[1] and syn[31] becomes vacant after the calculation of pcm[17]; following which the memory is vacated in the order syn[2] and syn[30], syn[3] and syn[29], and so on. Here, from syn[0] to syn[15], which are required for the calculation of the next (seventeenth) output audio samples from pcm[0] to pcm[31], are calculated and stored into these emptying portions (34 in FIG. 6).

As shown in FIG. 7, the data are mapped by the alternate selection of the first and second address generating circuits 39 and 40 by address selecting circuit 41. In other words, as shown in FIG. 5(b), when storing the first half of the results of the sixteenth discrete cosine transform in block 2 in a case in which band synthesis samples have earlier been stored in the arrangement shown in FIG. 7(a) in accordance with first address generating circuit 39, second address generating circuit 40 is selected for the new data and the band synthesis samples are substituted according to the arrangement shown in FIG. 7(b). When the results of the next discrete cosine transform are stored, first address generating circuit 39 is again selected and the results take the arrangement shown in FIG. 7(a).

Moreover, syn[16] of the least recent block 2 is necessary in the calculation of the seventeenth pcm[0]. Substituting of block 2, in which this syn[16] is stored, has already started when the seventeenth pcm[0] is being calculated, but the older data still remains and can be used in the calculation because the addresses of the data being substituted differ from the addresses of the previously written data. Accordingly, there is no need to provide memory for storing this syn[16], and the amount of memory can be correspondingly reduced.

While 16 blocks of 32 samples each were required in band synthesis memory 18 of the prior art as described hereinabove, band synthesis memory 8 of the present embodiment requires only 15 blocks of 32 samples each, thereby enabling a 6.25% reduction in memory capacity as compared with the prior art.

Of the different types of memory in audio signal processing circuits such as those described hereinabove, the band synthesis memory generally requires the greatest capacity, and this reduction in memory therefore enables a significant reduction in LSI chip surface area and a corresponding reduction in manufacturing costs.

It is to be understood that variations and modifications of terms or content disclosed herein will be evident to those skilled in the art. It is intended that all such modifications and variation be included within the scope of the appended claims.

What is claimed is:

1. An audio signal processing method for obtaining output audio samples from input subband samples that have been previously divided for each frequency band and quantized, providing a DCT memory for storing DCT samples requantized from said input subband samples, a DCT circuit for generating band synthesis samples by applying a discrete-cosine-transform to DCT samples stored in said DCT memory, and a band synthesis memory for storing the band synthesis samples generated by said DCT circuit, the method comprising steps of:

generating band synthesis samples from input subband samples by requantizing and applying a discrete-cosine-transform;

generating a first address series and a second address series that comprise mutually different mapping methods for storing said band synthesis samples in said band synthesis memory;

storing band synthesis samples into the band synthesis memory, by alternating between said first and second address series at every sample generation; and generating the output audio samples from the band synthesis samples stored in said band synthesis memory, wherein said band synthesis memory has only M−1 blocks, where M is a positive integer representing a number of band synthesis samples necessary for generating an audio output sample, each block stores a number of N band synthesis samples, wherein N is an integer product of 4, wherein said band synthesis samples are generated from every N input subband samples by requantizing and applying a discrete-cosine-transform, wherein every N band synthesis samples are stored into each block of the band synthesis memory, according to address series alternated between the first and second address series, and wherein each output audio sample is generated from M band synthesis samples picked out in the blocks of the band synthesis memory for each sampling period.

2. An audio signal processing circuit in which output audio samples are obtained by applying signal processing to input subband samples that have been previously divided for each frequency band and quantized, comprising:

a requantizing circuit that requantizes a number N, which is an integer product of 4, of inputted subband samples and outputs N DCT samples for discrete cosine transform;

a DCT memory in which are stored N DCT samples outputted from said requantizing circuit;

a DCT circuit that reads N DCT samples stored in said DCT memory, applies a discrete cosine transform, and generates band syntheses samples;

a band synthesis memory having only (M−1) blocks for storing band synthesis samples generated by said DCT circuit, each block comprising N samples;

first and second address generating circuits that generate an address for storing each band synthesis sample in said band synthesis memory;

an address selecting circuit that alternately selects addresses generated by one or the other of said first and second address generating circuits; and a band synthesis circuit that extracts band synthesis samples in portions of M samples from said band synthesis memory for each sampling period and synthesizes one output audio sample.

3. An audio signal processing circuit according to claim 2, wherein said DCT circuit temporarily halts discrete cosine transform processing after generating samples from (N/2) to (N−1), which are the second half of band synthesis samples; resumes discrete cosine transform processing upon the determination of the presence of unnecessary band synthesis samples, which are band synthesis samples within a block of said band synthesis memory into which results of discrete-cosine-transform processing have been least recently stored and have already been used in generating output audio samples such that the least recently stored band synthesis samples will not be used again; generates samples from (0) to (N/2−1), which are the first half of band synthesis samples; and stores these samples in the area in which said unnecessary band synthesis samples had been stored.

4. An audio signal processing circuit according to claim 2, wherein said DCT circuit first generates sample (N/2) when generating samples for (N/2) to (N−1), which are the second half of band synthesis samples.

5. An audio signal processing circuit according to claim 2, wherein first address generating circuit is provided with a first mapping method by which a total of N samples constituted by samples from (0) to (N/2−1), which are the first half of the N samples resulting from the nth discrete-cosine-transform, and samples from (N/2) to (N−1), which are the second half of the N samples resulting from the (n+1)th discrete-cosine-transform, are stored to prescribed addresses within said band synthesis memory, these being addresses from (1) to (N/2) and addresses from (N/2+1) to (N), respectively; second address generating circuit is provided with a second mapping method by which samples from (0) to (N/2−1), which are the first half of the N samples resulting from the nth discrete-cosine-transform, are stored to prescribed addresses from (1) to (N/4) and prescribed addresses from (3N/4+1) to (N); and moreover, samples from (N/2) to (N−1), which are the second half of the N samples resulting from the (n+1)th discrete-cosine-transform, are stored to prescribed addresses from (N/4+1) to (N/2) and prescribed addresses from (N/2+1) to (3N/4); and said address selecting circuit selects, when storing band syntheses samples in said band synthesis memory, of the first and second mapping methods, the mapping method that differs from the mapping method that was used in writing an immediately preceding block of band synthesis samples and outputs to said band synthesis memory.

* * * * *